Aug. 19, 1969     A. F. LEATHERMAN     3,462,336
INDUCTION HEATING PROCESS

Original Filed Oct. 21, 1965     3 Sheets-Sheet 1

INVENTOR.
A. F. LEATHERMAN
BY
Lieber & Nilles
ATTORNEYS

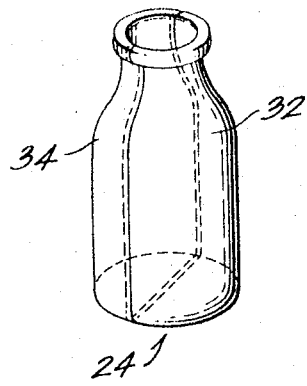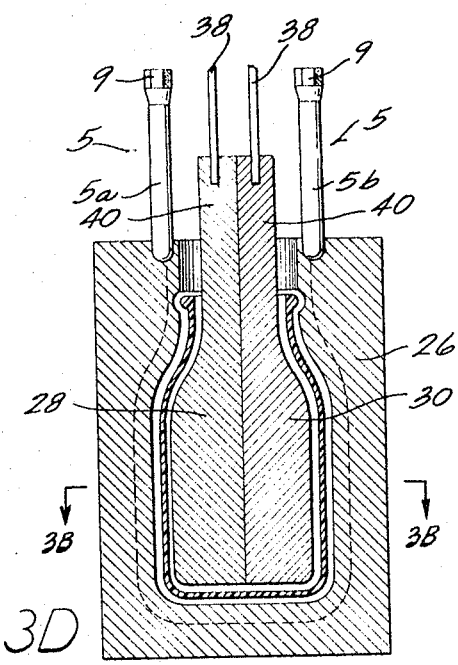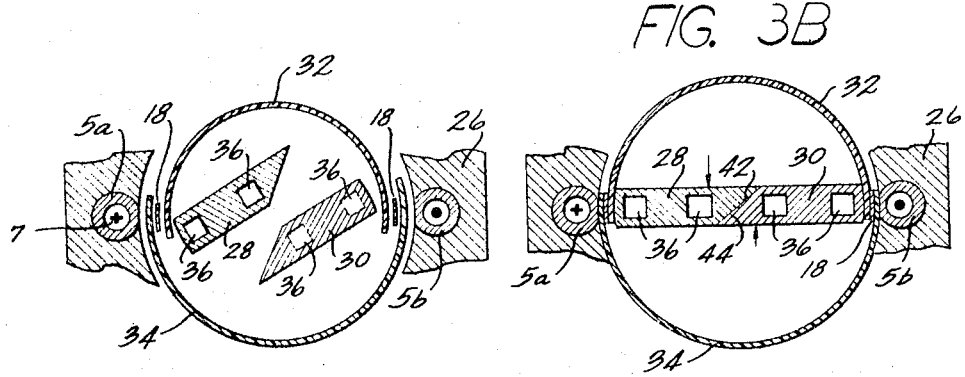

Aug. 19, 1969   A. F. LEATHERMAN   3,462,336
INDUCTION HEATING PROCESS
Original Filed Oct. 21, 1965   3 Sheets-Sheet 3
FIG. 4A
FIG. 4B
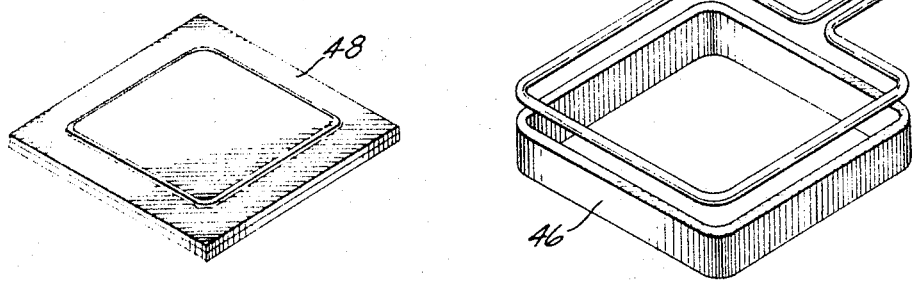
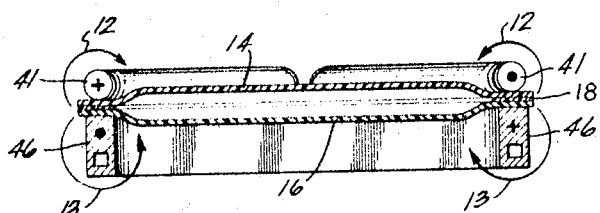
FIG. 4C
FIG. 4D
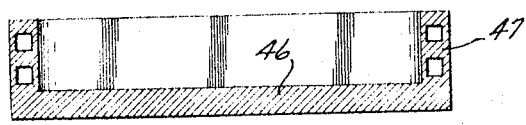
INVENTOR.
A. F. LEATHERMAN
BY
Lieber & Nilles
ATTORNEYS

United States Patent Office
3,462,336
Patented Aug. 19, 1969

3,462,336
INDUCTION HEATING PROCESS
Alfred F. Leatherman, Columbus, Ohio, assignor, by mesne assignments, to William C. Heller, Jr.
Original application Oct. 21, 1965, Ser. No. 499,150, now Patent No. 3,396,258, dated Aug. 6, 1968. Divided and this application May 17, 1968, Ser. No. 730,185
Int. Cl. B29c 27/04
U.S. Cl. 156—272      21 Claims

ABSTRACT OF THE DISCLOSURE

A process for inductively heating non-metallic material includes the step of applying a susceptor to the material. An induction heater is provided by forming a coil for producing a magnetic field when energized and spacedly positioning a non-magnetic, metallic member from the coil in the magnetic field. The material is placed between the coil and the metallic member and the heater energized to produce a high frequency high intensity magnetic field to inductively heat the susceptor and heat the material by conduction.

CROSS REFERENCE TO RELATED APPLICATION

This application is a divisional application of my co-pending application, Ser. No. 499,150, filed Oct. 21, 1965, now issued as U.S. Patent No. 3,396,258 on Aug. 6, 1968.

BACKGROUND OF THE INVENTION

This invention relates to induction heating processes and more particularly to a process providing superior operating efficiencies.

Induction heating is a thermal process in which in its well known forms, electric energy in the form of a high intensity high frequency magnetic field is applied to a metallic substance. The field produces eddy currents, or hysteresis losses, which cause heat to be generated in the substance itself. This method has been in common use for melting and heat treating metals for a number of years.

Induction heating may also be used in the thermal processing of non-metallic materials, such as plastics, by placing inductively heatable substances, as for example, certain metal or metal oxide structures or particles at points in the material where heat is desired, and then placing the composite structure in a magnetic field. For example, if it is desired to join two sheets of plastic, such as polyethylene, fine metal or metal oxide particles, or a metal screen, may be placed between the sheets at the points desired to be joined. When a magnetic field is applied to sheets, the particles or screen becomes heated, softening the plastic and allowing the two sheets to fuse. The metallic particles or structure is generally termed a "susceptor" to indicate its capability of being heated by a magnetic field.

The above method of thermal processing differs from dielectric thermal processing in which the non-metallic substances is itself heated by a high frequency electric field. Dielectric thermal processing involves considerations not here pertinent.

The advantages of such thermal process includes the fact that heat is generated only at the location where it is to be used, thereby providing ideal temperature distribution which permits accurate and beneficial control of temperature. Additionally, since heat is not required to flow from an external source through the material to the desired location, substantial increases in the rate of thermal processing are obtainable. The accurate temperature control and shortened exposure times prevent thermal damage, such as charring, warping or distortion from occurring during the processing.

It is necessary, in order to obtain the above advantages in commercially and technically feasible process, such as the heat sealing of plastics, to provide a magnetic force, or field, of the highest possible intensity and of the highest possible frequency so as to generate the greatest amount of heat by induction losses.

The equipment used to generate such a field generally consists of a field producing apparatus (e.g. "work coil") coupled to a high frequency power source. The attainment of both of the aforementioned criteria depends to a great extent upon the proper utilization of this apparatus in the process.

An excessive amount of inductance in the apparatus limits the magnitude of the high frequency current flowing through the apparatus and hence the intensity of the magnetic field generated thereby. While a greater applied voltage may be used to increase current flow, this introduces inefficiencies to the process. The size of the field producing apparatus may also be reduced to lower the inductance but often only at the expense of a decrease in processing speed or capacity.

Further, it is generally desirable to conduct the process with the apparatus in parallel resonance with the power source, as current flow at such a frequency is maximized. Resonant frequency is determined by the formula $$f_R = \frac{1}{2\pi\sqrt{LC}}$$

A low value of inductance permits the resonant frequency of the apparatus to be high enough to generate induction losses of the required magnitude. For example, a resonant frequency of 4 megacycles may be required in thermal processing non-metallic materials. This is significantly above the frequencies required for metallurgical uses which generally range from 3 kilocycles to 450 kilocycles.

It is also desirable to direct or channel the magnetic field of the apparatus so as to concentrate as much of it as possible in the material being thermally processed. Flux not so utilized performs no useful function and, unless cancelled out or reduced, increases the inductance of the apparatus unnecessarily.

SUMMARY

It is the object of this invention to provide an improved process of inductively heating non-metallic materials which process provides accurate temperature control at high processing speeds without the risk of thermal damage to the material, such process being particularly adapted for use in sealing or uniting non-metallic web materials.

In the performance of the process of the present invention, a susceptor susceptible to heating by a high frequency magnetic field is applied to the portions of the non-metallic material to be heat treated.

An induction heating apparatus is provided by forming a field producing coil and spacedly positioning a non-magnetic metallic member in the magnetic field of the coil. The metallic member is energizable when the coil is excited to concentrate the magnetic field in the space between the member and the coil and to reduce the inductance of the heating apparatus.

The material is placed between the coil and the member. The magnetic field inductively heats the susceptor which, in turn, heats the non-metallic material by conduction to provide the desired heat treatment.

BRIEF DESCRIPTION OF THE DRAWING

The invention may be better understood by reference to the following specification and drawings, forming a part thereof, in which:

FIGURES 3a, 3b, 3c, and 3d show another embodiment of the process of the present invention particularly adapted to the sealing of articles made from non-metallic materials; and FIGURES 4a, 4b, 4c, and 4d show a further embodiment of the process of the present invention particularly adapted to seal the periphery of a plastic sheet.

DESCRIPTION OF THE PREFERRED EMBODIMENTS

In the specification and drawings, the utility of the present invention is demonstrated by showing its application in sealing plastic or plastic coated structures by inductively heating a susceptor placed between the plastic structures. It is to be understood that the use of the invention is not so limited. In addition to the aforementioned plastic, the process may be used to advantage with cardboard stock, wood, rubber, glass and paper. The process also finds utility in many fields of manufacture.

Figure 1A:
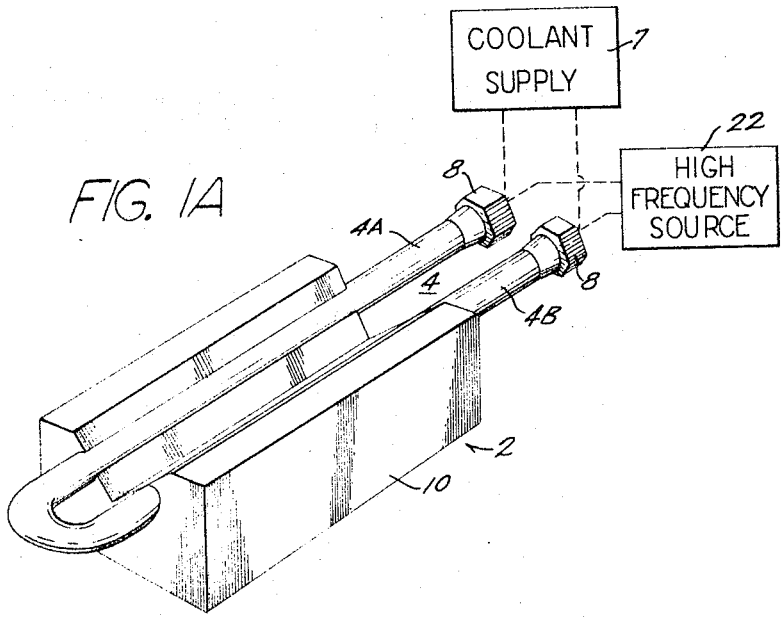
FIGURES 1a and 1b show an induction heating apparatus.

Referring now to the figures, and specifically to FIG. 1a, there is shown therein an induction heat sealing apparatus 2. The apparatus includes a coil member 4. While coil member 4 may comprise any number of loops, the lowest value of inductance is obtained with a coil of a single loop having the smallest enclosed space. Hence, coil 4 as shown in FIG. 1a is shaped in the form of a single loop or "hairpin" with two parallel members 4A and 4B. As is customary in the art, coil 4 may contain cavity 6 for the conduction of a cooling fluid therethrough. Coil 4 is connected to a coolant supply 7 and a high frequency power source 22 by connectors 8. High frequency power source 22 may, for example, provide coil 4 with power of 4 megacycle frequency. Coil 4 may be supported and insulated by electrically non-conducting support 10.

It will be appreciated that when high frequency electric current is applied to coil 4 from source 22 a magnetic field will be generated which will surround each of the parallel members of coil 4. While this magnetic field will exist at all points about each of the members of coil 4, the point of greatest intensity will be between the members of coil 4. Assuming the instantaneous direction of the high frequency current to be into the plane of the paper in loop member 4B, as shown by the tail of the current arrow, and out of the plane of the paper in loop member 4A, as shown by head of the current arrow, the direction of the magnetic field between the members of coil 4 is shown by arrows 12. The direction of this field will, of course, reverse as the direction of current in the members of loop 4 reverses.

When two plastic sheets 14 and 16 having a susceptor 18 between them are placed between members 4A and 4B of coil 4, the susceptor will become heated by the aforementioned mechanism of eddy current and/or hysteresis heating. This heat will be transferred to the adjacent internal surfaces of plastic sheets 14 and 16 softening them and permitting them to become fused or sealed upon removal of the sheets from between members 4A and 4B. Such a process may be used to form the corner seam of a plastic package.

Figure 1B:
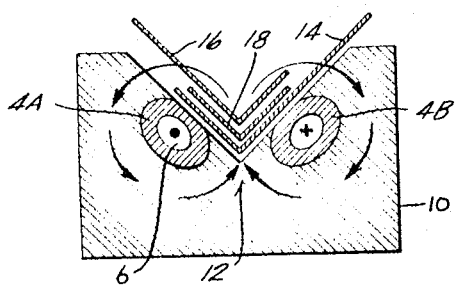

While the coil structure shown in FIG. 1a and FIG. 1b is one of relatively low inductance since it consists of a single loop, the inductance may still not be sufficiently low to provide the desired resonant frequency or field strength. Additionally, the magnetic field generated by coil 4 is of greatest intensity only between coil members 4A and 4B rather than throughout the entire area covered by susceptor 18.

Figure 2:
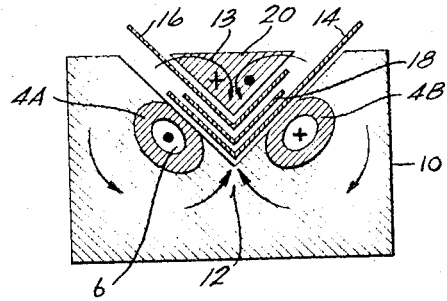
FIGURE 2 shows one embodiment of an improved low inductance heating apparatus and the process of the present invention.

FIG. 2 shows an induction heating apparatus coil which provides a low inductance and a concentrated magnetic field. Similar to the coil shown in FIGS. 1a and 1b, the coil of FIG. 2 contains a pair of parallel members 4A and 4B supported in support 10. In addition, the coil of FIG. 2 includes an electrical "reinforcing" member 20, so termed because it reinforces or concentrates the magnetic field generated by coil members 4A and 4B. Reinforcing member 20 is located between coil member 4A and coil member 4B and may be wedge shaped in form. Other shapes may be used if desired. Plastic sheets 14 and 16 and susceptor 18 are placed between coil members 4A and 4B and reinforcing member 20. Upon connecting coil 4 to a source of high frequency electrical energy 22, a current will be induced in reinforcing member 20 by the magnetic field generated around coil 4. The direction of current flow in reinforcing member 20 will be in an opposite sense to that of coil member 4 as shown by the head and tail of arrows for an instantaneous case in FIG. 2. The development of this current flow and its polarity in reinforcing member 20 is described by the physical principles of Lenz's law.

The current flow in reinforcing member 20 will produce a magnetic field about that member shown schematically by the numeral 13. The portion of magnetic field 12 formerly present in the area occupied by reinforcing member 20 will be neutralized by the action of the current induced in reinforcing member 20. Specifically, this is due to the opposition of magnetic field 13 (created by the induced currents) to magnetic field 12. This eliminates the portion of the field 12 generated by coil 4 that was useless and unneeded in the sealing process since it was remote from the location of susceptor 18. The elimination of this flux also significantly reduces the inductance of coil 4. In addition, and equally important, the intensity of the magnetic field immediately between reinforcing member 20 and each of the coil members 4A and 4B is increased, as the field 13 generated by reinforcing member 20 in this region reinforces the field 12 created by coil 4. This increase, of course, is highly desirable as it occurs in the region required for induction heat treating of plastic sheets 14 and 16. The intensity of the magnetic field in the aforementioned space may be increased up to a theoretical maximum of twice the intensity present at the corresponding point in FIG. 1b as a result of the reinforcement of magnetic field 12 by magnetic field 13.

In electrical construction, reinforcing member 20 may be electrically isolated, or grounded, as desired. Reinforcing member 20 should be constructed of a good electrical conductor, such as silver, copper, or brass. From the mechanical standpoint, reinforcing member 20 should be a good thermal conductor and hence a construction of solid silver, copper with silver plating on the surfaces adjacent coil members 4A and 4B, solid copper, or brass with silver or copper plating on the surfaces adjacent coil members 4A and 4B provide a good combination of both electrical and mechanical requirements. If necessary, reinforcing member 20 may be cooled by convection, conduction or forced cooling. Thus, member 20 may be solid and air-cooled, solid with liquid coolant circulating tubes attached thereto, or hollow with internal fluid passages similar to those of coil member 4. Cooling of reinforcing member 20 serves to maintain the mechanical and electrical characteristics of the member.

By adequate cooling of reinforcing member 20 further advantages of the present invention may be obtained. Not only may reinforcing member 20 provide the aforementioned reduction in external impedance of coil member 4 and an increase in the useful magnetic field, it may also be used as a pressure element or positioning element for plastic sheets 14 and 16 and susceptor 18. For instance, flat plastic sheets 14 and 16 may be placed on support member 10 with susceptor 18 between them and bent to the required position shown in FIG. 2 by the insertion of a wedge shaped reinforcing member 20 into support 10. During the time susceptor 18 is heated by the magnetic field generated by coil member 4 and reinforcing member 20, the latter member may be used as a pressure element in connection with support member 10 to insure greatest possible contact between plastic sheets 14 and 16 and susceptor 18. When the required degree of heat has been produced in susceptor 18 and the adjacent surfaces of sheets 14 and 16, high frequency source 22 may be disconnected from coil 4 and reinforcing member 20 and the coil, cooled by the aforesaid means, used to rapidly solidify the heated portions of plastic sheets 14 and 16. This also increases the speed with which the thermal processing may be performed.

FIG. 3 illustrates an induction heating process, incorporating the principles outlined in FIG. 2, which is suitable for induction heat sealing the two halves of a plastic article. This may, for example, be container 24 as shown in FIG. 3a. Coil 5 having members 5A and 5B is arranged in a loop, the configuration of the loop conforming roughly to the cross sectional shape of container 24. Coil 5 is mounted in a support member 26 having a hole in the center thereof which corresponds to the cross sectional configuration of container 24. Coil 5 is supplied with high frequency alternating current and a coolant for a hollow cavity 7 therein through connectors 9. The reinforcing member takes the form of a divided interior member arranged in two halves 28 and 30 to permit their removal from container 24 after the two container halves 32 and 34 have been sealed. The halves 28 and 30 of the reinforcing member conform to the inner configuration of container 24 and include mating diagonal edges 42 and 44. Reinforcing members 28 and 30 contain passages 36 through which a cooling medium supplied by pipes 38 may be circulated to cool the members.

The two halves 32 and 34 of container 24 are assembled adjacent coil member 5 with magnetically heatable susceptor 18 between the halves. The assembly is retained in position by positioning reinforcing members 28 and 30 as shown in FIG. 3b. High frequency power is then supplied to coil 5 which induces heat in susceptor 18 softening the portions of container halves 32 and 34 in contact therewith. Reinforcing members 28 and 30 operate in the same manner as reinforcing member 20 to concentrate the magnetic field produced by coil member 5 along the overlapping edges of container halves 32 and 34. Pressure may be applied to the halves of container 24 by a force exerted on the exposed ends 40 of reinforcing members 28 and 30 in the direction of the arrows in FIG. 3b. The diagonal edges 42 and 44 provide for an outward extension of the reinforcing members creating the pressure. A downward force may also be provided on the exposed ends 40 of reinforcing members 28 and 30 to form the seal on the bottom of container 24. As previously described, when portions of container halves 32 and 34 have been softened by the heat from susceptor 18 and fused from the pressure exerted by reinforcing members 28 and 30, power may be removed from coil 5 and the temperature thereof reduced by the coolant in passages 7 and 36 to hasten the solidification of the edges of container halves 32 and 34. When the halves have been joined, the container may be removed from support 26 and reinforcing members 28 and 30 extracted from the container by breaking them apart as shown in FIG. 3c and removing them through the neck of container 24.

It is to be understood that the configuration of container halves 32 and 34 as shown in FIG. 3 is not the only one that may be employed to form a container 24. For example, container halves 32 and 34 may have abutting edges with susceptor 18 between them rather than the overlapping edges as shown in FIGS. 3b and 3c. Other configurations may be employed, such configurations being considered well within the knowledge of one skilled in the art.

FIG. 4 shows a process which may be used to seal the periphery of two plastic sheets 14 and 16 by means of a susceptor 18, as for example, to form the flat package 48 with the central cavity shown in FIG. 4a. The process employs a coil 4 similar to that described above and a reinforcing member 46 which is similar in function and operation to reinforcing member 20 of FIG. 2 and reinforcing members 28 and 30 of FIG. 3. Reinforcing member 46 may be constructed in the form of the hollow ring shown in FIG. 4b or in the shape of a dish having an upturned edge 47 as shown in FIG. 4d. As above, reinforcing member 46 provides induced currents opposing the currents in coil 4. The induced currents in reinforcing member 46 intensify the magnetic field between member 46 and coil 41. Member 46 may also provide pressure and cooling to the plastic sheets forming package 48 in the same manner as the reinforcing members described above. Additionally, reinforcing member 46 reduces the inductance of coil 41 by providing a counteracting magnetic field 13 which eliminates unneeded flux 12 in the center portion of coil 41. This flux is unneeded, of course, because induction heating of susceptor 18 occurs only at the edges of sheets 14 and 16.

It will be appreciated that modifications and embodiments of the above described invention may be made and it is desired to include all such embodiments as come within the scope and spirit of the appended claims.

I claim:
1. A process for inductively heating a non-metallic material comprising the steps of:
  applying a susceptor susceptible to heating by a high frequency magnetic field to the portions of the non-metallic material to be heated;
  providing an induction heater by forming a coil for producing a surrounding high frequency magnetic field when energized, and spacedly positioning a non-magnetic, metallic member from the coil in the magnetic field to increase the intensity of the field and reduce the inductance of the coil;
  placing the material portions having the susceptor applied thereto between the coil and the metallic member; and
  energizing the induction heater with high frequency electric current to produce a high frequency, high intensity magnetic field thereby to inductively heat the susceptor and heat the material by conduction.

2. The process of claim 1 including the step of applying pressure to said material by relatively moving the coil and the metallic member toward each other.

3. The process of claim 1 wherein the material is plastic and the susceptor is iron oxide.

4. The process of claim 1 further defined as including the step of cooling the coil to cool the material after it has been heated.

5. The process of claim 4 further defined as including the step of cooling the metallic member to cool the material after it has been heated.

6. The process of claim 1 wherein the step of placing the material between the coil and the metallic member is further defined as positioning the material portions having the susceptor applied thereto between the coil and the metallic member by means of the metallic member.

7. The process of claim 1 wherein the step of providing an induction heater is further defined as forming the coil in a single loop.

8. The process of claim 1 wherein the step of providing an induction heater is further defined as forming a coil in a single loop with a pair of parallel members for producing a surrounding high frequency magnetic field when energized and spacedly positioning a wedge shaped non-metallic member at least partially between the parallel members and in the magnetic field to increase the intensity of the field.

9. A process for inductively heating non-metallic article portions to form an article by heat sealing the portions at selected locations; said process comprising the steps of:

applying a susceptor susceptible to heating by a high frequency magnetic field to at least one of the article portions at the selected locations to be sealed;

providing an induction heater by forming a coil in a single loop with an opening to receive the portions, said coil producing a high frequency magnetic field when energized, and spacedly positioning a non-magnetic metallic member in the opening and in the magnetic field to increase the intensity of the field and reduce the inductance of the coil;

placing the article portions in the opening of the coil with the selected locations adjacent each other and between the coil and the member; and energizing the induction heater with high frequency electric current to produce a high frequency, high intensity magnetic field to inductively heat the susceptor and to heat the selected locations by conduction to seal the portions.

10. The process of claim 9 wherein the article formed is a hollow container and wherein the process is further defined as assembling the article portions after applying the susceptor so that the selected locations are adjacent each other, positioning the metallic member inside the hollow article portions when so assembled, and removing the metallic member from the assembled portions after energizing the induction heater.

11. The process of claim 9 further including the step of applying pressure to the portions by moving the metallic member toward the coil.

12. The process of claim 11 including the step of applying pressure to the portions by expanding the dimensions of the metallic member so as to move it toward the coil.

13. The process of claim 8 further defined as including the step of cooling the coil to cool the selected locations after they have been heated.

14. The process of claim 13 further defined as including the step of cooling the metallic member to cool the selected locations after they have been heated.

15. The process of claim 1 wherein the step of providing an induction heater is further defined as providing a generally planar coil formed in a single loop and shaped to correspond to the portions of the non-metallic material to which the susceptor has been applied and positioning a non-magnetic metallic member having a portion presenting a generally planar surface similar in shape to the coil so that the portion is in the magnetic field and in alignment with, but spaced from, the coil.

16. A process for inductively heating non-metallic article portions to form an article by heat sealing the portions at selected locations, said process comprising the steps of:

applying a susceptor susceptible to heating by a high frequency magnetic field to the article portions at the selected locations to be sealed;

assembling the portions so that the locations are adjacent each other;

providing an induction heater by forming a generally planar single loop coil shaped to correspond to the selected locations, said coil producing a high frequency magnetic field when energized, and positioning a non-magnetic metallic member having a portion presenting a generally planar surface similar in shape to the coil so that the portion is in the magnetic field and in alignment with, but spaced from, the coil;

placing the assembled portions in the induction heater so that the selected locations are between the coil and the metallic member; and energizing the induction heater to produce a high frequency, high intensity magnetic field to inductively heat said susceptor and heat the material by conduction at the selected locations to seal the portions.

17. The process of claim 16 further including the step of applying pressure to the portions by relatively moving the metallic member and coil toward each other.

18. The process of claim 16 further defined as including the step of cooling the coil to cool the portions at the selected locations.

19. The process of claim 18 further defined as including the step of cooling the metallic member to cool the portions at the selected locations.

20. The process of claim 16 wherein the step of placing the material between the coil and the metallic member is further defined as positioning the portions by means of the metallic member.

21. The process of claim 16 further characterized in that said article formed is a container produced by sealing the non-metallic article portions at locations about the periphery thereof.

References Cited

UNITED STATES PATENTS

| 2,475,348 | 7/1949 | Black | 219—10.53 |
| 3,367,808 | 2/1968 | Edwards | 156—272 |

DOUGLAS J. DRUMMOND, Primary Examiner

U.S. Cl. X.R.

156—380; 219—10.43, 10.49, 10.53, 10.81